May 22, 1962 J. LYSOBEY 3,035,302
EXTRUSION AND FORMING OF PLASTIC TUBING
Filed March 11, 1959 4 Sheets-Sheet 1

INVENTOR.
BY John Lysobey

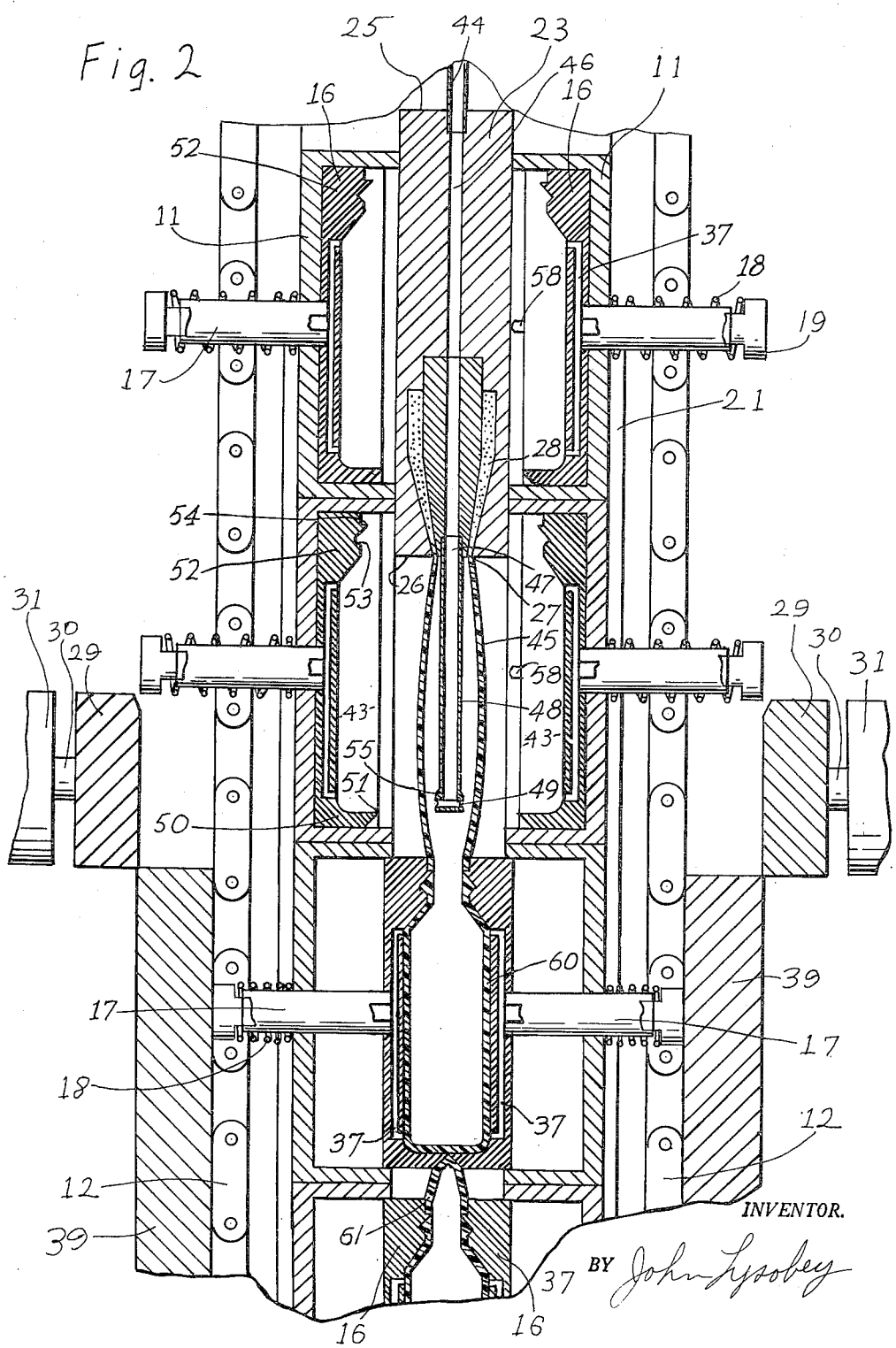

May 22, 1962    J. LYSOBEY    3,035,302
EXTRUSION AND FORMING OF PLASTIC TUBING
Filed March 11, 1959    4 Sheets-Sheet 3
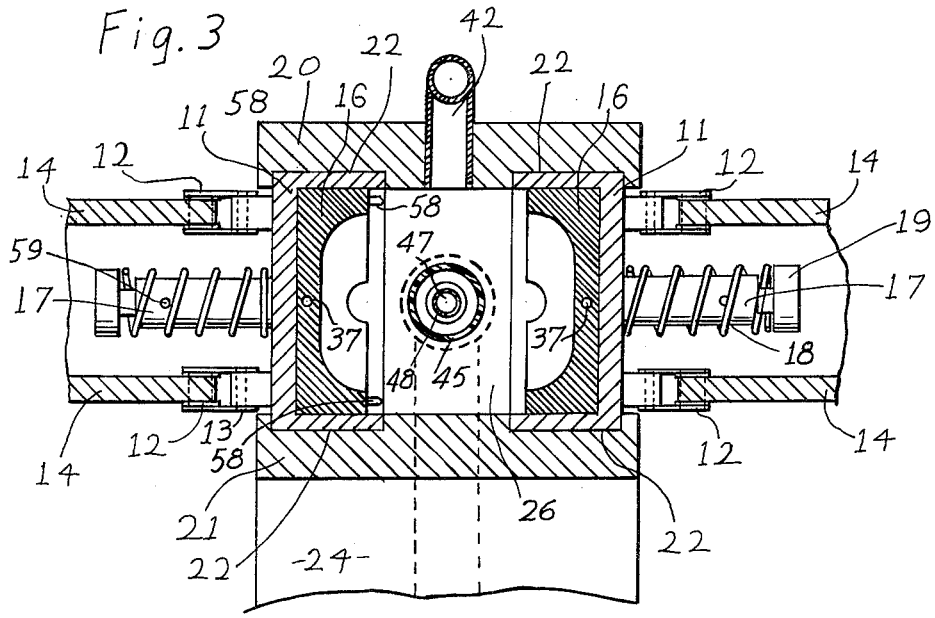
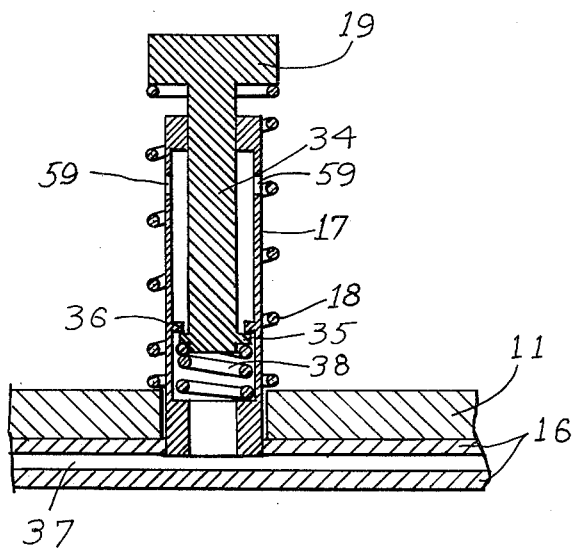
INVENTOR.
BY John Lysobey May 22, 1962 — J. LYSOBEY — 3,035,302
EXTRUSION AND FORMING OF PLASTIC TUBING
Filed March 11, 1959 — 4 Sheets-Sheet 4
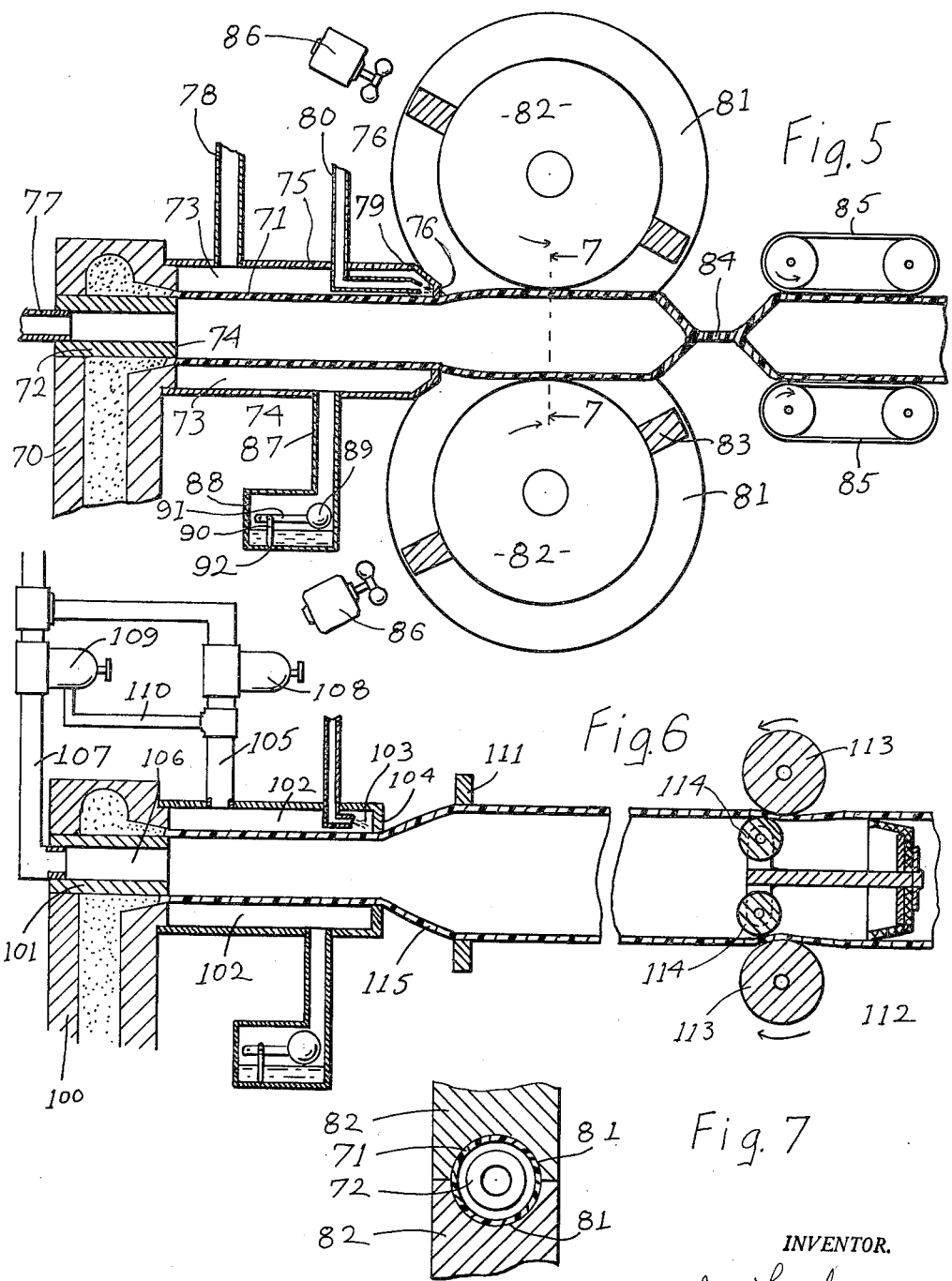
INVENTOR.
BY John Lysobey United States Patent Office 3,035,302
Patented May 22, 1962

3,035,302
EXTRUSION AND FORMING OF
PLASTIC TUBING
John Lysobey, Grumman Ave., Norwalk, Conn.
Filed Mar. 11, 1959, Ser. No. 798,665
11 Claims. (Cl. 18—5)

This invention relates to methods and apparatus for extruding plastic material in tubular form and the shaping and forming of the tubular material.

In machines now making hollow thermoplastic articles, thermoplastic tubing in a moldable condition is enclosed by a mold and then expanded by internal fluid pressure until it conforms to the mold shape. It is desirable to combine this operation with the continuous extrusion of the tubing but the pressure necessary to expand the tubing is more than soft extruded tubing near the extruding die can withstand and will uncontrollably expand and burst the tubing between the extrusion die and the mold form. Methods now in use involve blocking off sections of the extruded tubing by pinching tubing or closing tubing around mandrel and using an accessory method for introducing pressure into the tubing for expanding the tubing.

These methods require complicated machinery and high costs are due to slow production cycles.

This invention uses an enclosure containing a fluid pressure around the tubing adjacent to the extrusion means, with the fluid pressure adjusted to control the expansion of the tubing by balancing the external pressure against the internal pressure of the tubing and then reducing the external pressure at the point where expansion of the tubing is desired or the tubing has hardened sufficiently to withstand the pressure.

A primary object of the invention is to provide an improved method and machinery for the production of hollow thermoplastic articles at a high rate, at lower cost and with less complicated machinery than presently known machines.

A further object of the invention is to produce at low cost a heat shrinkable thermoplastic tubing by maintaining sufficient pressure inside of the tubing being extruded to expand it at the point where the temperature of the tubing has reduced to the optimum point for stretching to produce heat shrinkable tubing.

A further object is to more accurately size and shape tubing by maintaining a higher pressure within the tube to expand tubing against sizing and shaping external dies when the tubing has cooled and hardened more than is possible with prior methods.

A still further object is to provide a method for the low cost production of hollow flexible walled objects that require internal pressure to keep the finished article from collapsing.

A still further object is to provide an economical method of producing hollow pressurized thermoplastic articles that can be later placed in molds, softened by heat and expanded with the self contained pressure.

Other features and advantages of this invention will become apparent to persons familiar with this type of equipment and referring to the accompanying drawings and reading the following specifications.

In one embodiment of the invention a machine is shown for molding hollow thermoplastic articles by conveying a succession of mold halves through a pressurized enclosure on opposite sides of sections of tubing being extruded. The mold halves close around the tubing. A continual supply of fluid pressure is maintained in the tubing by a passage through the extrusion die. The pressure is released inside the closed mold between the mold faces and the outside of the enclosed tubing allowing the tubing to expand and conform to the mold faces which cool and harden the plastic material by contact.

Another embodiment shows a method of using a rotary mold to shape the tube into hollow articles as it is expanding with the internal pressure as it leaves the pressurized enclosure.

A third embodiment shows a method of using the pressurized enclosure to produce continuous lengths of expanded tubing without the tubing being pinched at intervals to block the escape of fluid pressure within the tube.

FIGURE 2 is a part of the machine of FIGURE 1 showing in enlarged section the area containing the extrusion die, the pressurized enclosure, and the area where the bottles are being formed. Details of mold closing rods 17 in sections are omitted from the drawing.

FIGURE 3 is a section of FIGURE 1 on line 3—3 showing the mold sockets and mold halves in the guide plates and a fragment of the extrusion machine.

FIGURE 4 shows in section the mold closing rods 17, of FIGURES 1, 2 and 3, in detail.

FIGURE 5 is a side view in section of a machine containing extrusion means, a pressurized enclosure and rotary molds forming hollow plastic articles.

FIGURE 6 shows a side view in section of a machine using a pressurized enclosure to produce continuous lengths of expanded tubing without pinching the tubing.

FIGURE 7 is a section of the machine in FIGURE 5 taken on line 7—7.

Figure 1:
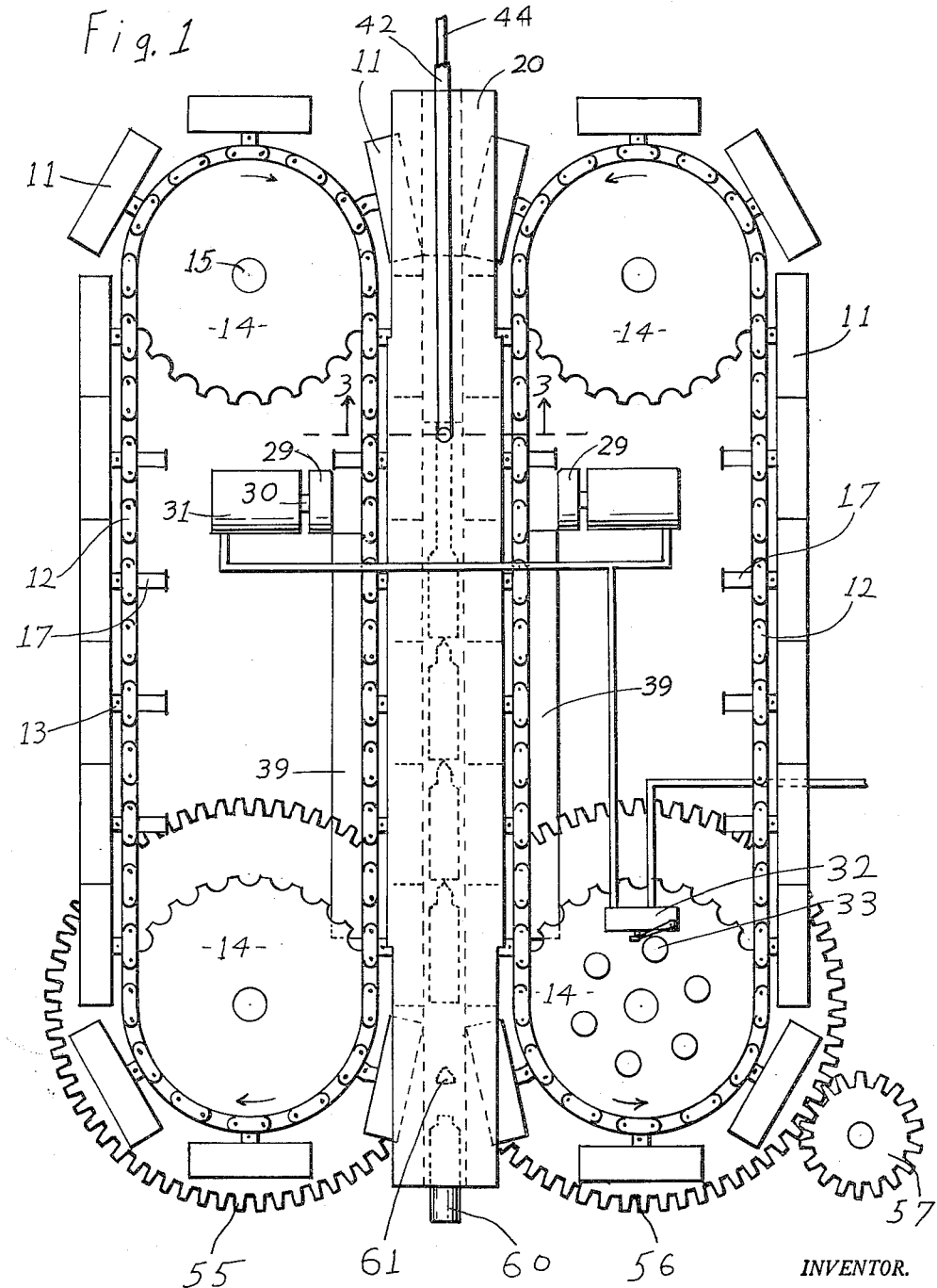
FIGURE 1 is a front view of a machine for molding hollow plastic articles showing by broken lines the formation of bottles from the tubing.

In the figures shown conventional and obvious support parts and brackets for the machine parts shown are omitted to show more clearly the invention.

In the molding machine shown in FIGURES 1, 2, 3 and 4, two conveyor type roller chain assemblies traveling in a vertical plane are continually bringing matching pairs of mold sockets and mold halves to travel through the guide plate channels together on opposite sides of the tube extrusion crosshead die and extruded tube.

Mold sockets 11 are fastened to roller chains 12 by attachment links 13. Each mold socket 11 is fastened to two parallel roller chains 12 traveling on chain sprockets 14 mounted on shafts 15. In each mold socket 11 is slidably fitted a mold half 16. Securely fastened to each mold half 16 is a mold closing rod 17. The mold closing rod is a loose slidable fit in an opening in the mold socket 11. The mold halves 16 are kept normally retracted in the mold sockets by compression springs 18 continually applying a force between mold sockets 11 and mold closing rod heads 19. These mold sockets and roller chains form two conveyors traveling on the chain sprockets 14 so as to bring matching mold halves and mold sockets traveling parallel paths down through guide plates 20 and 21. These guide plates contain two channels 22 into which the sides of the mold sockets are a slidable fit. The guide plates 20 and 21 are placed a distance apart to allow the mold sockets 11 to be a slidable fit between the opposing channels 22 in the two guide plates. The width of mold halves 16 is such as to create a sliding fit in the space between channeled sections of guide plates 20 and 21 when the molds are closed. At the ends of the guide plates, the plates are cut away on the sides to permit the entrance and departure of the mold sockets. Through a hole cut in the rear guide plate 21 the crosshead die 23 is fitted and is of a size to completely fill the space between the guide plates 20 and 21 and the moving mold sockets 11 traveling in channels 22 and between the crosshead die face 25 and crosshead die face 26. The crosshead die has an orifice 27 from which plastic material 28 is continuously extruded in tubular form in a downward direction midway between matching mold halves. Mold closing bars 29 are connected by shafts 30 to air cylinders 31. Lever valve 32 controls the air cylinders 31 and is actuated by knobs 33 mounted on one of the chain sprockets 14. The mold closing rods 17 contain a valve stem 34 with an enlarged head 19 and a valve plate 35 which is normally seated against valve seat 36. This valve plate 35 against valve seat 36 shuts off the passage of fluid pressure from mold vents 37 except when valve stem 34 compresses spring 38 thereby moving valve plate 35 from valve seat 36 allowing the passage of fluid under pressure from the mold cavities through vents 37. Mold holding bars 39 hold the mold halves 16 together by means of mold closing rods 17 after the mold halves have been closed by mold closing bar 29 and sliding from mold closing bar 29 to mold holding bar 39 by the downward movement of the mold sockets 11. After mold closing rod head 19 has moved from mold closing bar 29 knob 33 moves beyond lever valve 32 which releases the air in air cylinders 31 thereby allowing closing bars 29 to retract by springs (not shown) contained within air cylinders 31. When mold closing rod heads 19 are carried beyond the end of mold holding bars 39 by the movement of mold sockets 11 the springs 18 retract the mold halves into the mold sockets thereby opening molds. Spring 38 allows overtravel for mold closing rods 17 and head 19 travels further than is necessary to close molds thus providing for a surer closing of the molds and less necessity for a precise adjustment of mold holding bars 39.

A pressurized enclosure 43 is created by the guide plates 20 and 21 on two sides, on the top by the mold sockets 11 moving downward and the crosshead die 23, on two sides by the mold sockets 11 moving closely end to end and containing the mold halves 16, on the bottom by the mold sockets and the closed molds.

Tube 42, connected to any convenient source of fluid pressure such as air, admits fluid under pressure into the pressurized enclosure 43.

Tube 44, connected to any convenient source of fluid pressure such as air supplies fluid under pressure to the inside of the plastic tubing 45 through passage 46 through the crosshead die 23 and through passage 47 in the mandrel 48 with the fluid under pressure entering the plastic tubing 45 through holes leading from passage 47 to a peripheral groove 49 in the enlarged head 55 of the mandrel. The mold halves 16 are shaped to form a bottle. The bottom end 50 of the molds 16 contains cutting edges 51 which cut off the plastic tubing 45 at the same time these same edges pinch together and weld the walls of the plastic tube 45 to form the bottom of the bottle.

The top ends 52 of the mold halves 16 are shaped to form a neck in the bottle and fit tightly around the plastic tubing 45 when the molds are closed. Recessed grooves 53 and cutoff projections 54 are provided in each mold half. The surface of the mold between cutoff projections 54 and the top 41 of the mold half 16 are preferably finished with a rough surface so as to more firmly grip the plastic tubing 45.

The enlarged head 55 on the mandrel 48 is the same size as the opening between the cutoff projections 54.

The two chain and sprocket conveyor assemblies are moved in synchronism by spur gear 55 turned by spur gear 56. The entire assembly is moved by spur gear 57 connected to any suitable means (not shown) such as an electric motor.

In the operation of the machine a thermoplastic material 28 is continuously extruded by an extruder 24 from an orifice 27 in the crosshead die 23 downward into pressurized enclosure 43. Air under pressure is admitted into the inside of the plastic tubing 45 through the crosshead die 23 by means of tube 44, passage 46 and through mandrel 48 of a pressure sufficient to expand the plastic tubing into the molds. Air under pressure is admitted into the pressurized enclosure 43 to balance the pressure in the inside of the plastic tubing 45 and keep it from uncontrollably expanding and bursting before it is surrounded by the mold. A few ounces less pressure is usually preferable in the pressurized enclosure 43 than in the inside of the plastic tubing 45 to keep the plastic slightly expanded to give more clearance between the mandrel 48 and the plastic tubing 45. In addition to the downward movement of plastic tubing 45 by gravity it is pulled downward by the downward movement of molds which have already engaged the tubing.

A continuous succession of paired mold halves 16 and mold sockets 11 is moved down, through the channels 22 in the guide plates 20 and 21, on opposite sides of the crosshead die 23 and the plastic tubing 45 being extruded.

When the back ends 41 of the mold halves have moved below die face 26 one of the knobs 33 on one of the sprockets 14 is so placed as to actuate lever valve 32 admitting air in air cylinders 31 which pushes mold closing bars 29 against mold closing rod head 19 thereby bringing together the mold halves 16 around a section of the plastic tubing 45. Alignment pins 58 help the proper alignment of mold halves 16. The length of the mandrel 48 is such as to place the enlarged head 55 of the mandrel between the bottom end 50 of the mold and top end 52 at the time of closing the mold.

When the mold halves 16 are closed together, additional travel of the closing bars 29 against the heads 19 of the valve stems 34 compresses spring 38 moving valve plate 35 from valve seat 36 thereby releasing fluid pressure between the outer wall of a section of plastic tubing 45 and mold faces through vents 37 and through mold closing rods 17 and out of passages 59. This release of air expands the plastic tubing 45 to conform to the mold faces which cool and harden the plastic material by contact. As the molds move downward between the guide plates 20 and 21 the neck part of the formed bottle moves over the enlarged head 55 of the mandrel 48 thereby sizing the inside bore of the bottle neck, forcing plastic into groove 53 and sever plastic tube at the cutoff projections 54. Fluid under pressure is being admitted into the plastic tubing 45 through passages 46 and 47 into peripheral groove 49 which fluid helps to prevent the plastic from adhering to enlarged head 55 of the mandrel 48. When the molds have moved downward to where the mold closing rod heads 19 slide off the end of mold holding bar 39 springs 18 retract the mold halves in mold sockets 11 thereby opening mold and the molded bottle 60 and the cutoff piece 61 of plastic tubing drop out of mold and the molds continue around the sprockets and repeat the operation in succession with the other molds.

The molding of a bottle is shown by way of illustration. Objects of many shapes will be formed in this machine and will require many modifications for different articles. For instance the mandrel may be rotated to form internal threads in the bottle neck or it may work with a reciprocal motion to shape the plastic material. The machine as shown will work efficiently with the mandrel removed from the machine although this will require the bottle neck to be trimmed by another operation. The tubing may be extruded in whatever shape, size or wall thickness is most suitable for the object being formed. The plastic material may also be extruded into the pressurized enclosure in one or more strips and formed into a tubular structure by additional means such as pinching together between the mold halves.

Or the tubing may be pinched closed on both ends of the mold with the expansion caused by the air under pressure that is already in the section of the tubing. This means may be used to make flexible walled plastic articles that require a pressure in the finished article to keep the article inflated.

The molds may also be made the same size as the tubing thereby preventing the tubing from expanding while sealing closed the ends of the tubing section. The molds cool and harden the tubing thereby providing a sealed pressurized tube.

While mold halves moving in conveyor fashion are shown, any method of enclosing sections of tubing in molds within a pressurized enclosure such as a rotating turntable or reciprocating molds are considered within the scope of the invention.

In the molding machine described I have shown the use of air as the fluid under pressure; however, any suitable gas or even liquids may be used. This fluid pressure may contain other materials such as materials to coat or color the plastic tubing or solvents to aid in welding the tubing.

The plane of operation of the machine is optional and any plane or direction may be used.

The form of the invention shown in FIGURES 5 and 7 shows a fragment of extrusion machine 70 continuously extruding thermoplastic tubing 71 through a crosshead die 72 into a pressurized enclosure 73 formed by the crosshead die face 74, enclosing structure 75 and external sizing die 76. Fluid under pressure is introduced into the thermoplastic tubing 71 through a passage in the crosshead die 72 by tube 77 connected to any convenient source of fluid under pressure. Fluid under pressure is introduced into the pressurized enclosure 73 by tube 78 connected to any convenient source of fluid pressure.

The pressure inside the tubing 71 and the pressure in the pressurized enclosure 73 are kept at approximately the same pressure. The pressure in either may be varied to cause either a swelling or reduction in size of the plastic tubing 71 within the pressurized enclosure 73 if desired. A liquid spray 79, inside the pressurized enclosure, with liquid supplied at a suitable temperature from any convenient source through tube 80 cools and lubricates the plastic tubing 71 and die 76. Sump chamber and tube are provided to remove liquid from the pressurized enclosure without lowering the pressure. The liquid runs down tube 87 to enclosure 88. When liquid level rises in enclosure 88 it lifts float 89 opening needle valve 90 by means of lever 91 allowing liquid to escape through orifice 92.

As the thermoplastic tubing 71 is pulled through the die plate 76 and therefore out of the pressurized enclosure 73 the internal pressure in the thermoplastic tubing 71 starts to expand the still soft plastic tubing 71. This tubing expands until it touches the surfaces 81 of the rotary molds 82 where it is cooled and hardened by contact with the mold. Pinching blocks 83 are fitted into the rotary molds to close together and weld the walls of the plastic tubing at successive intervals as at section 84 of the plastic tubing. These closed sections keep the pressure inside the tube from escaping through the plastic tubing. The rotary molds 82 are revolved in synchronism by any suitable means (not shown) to continuously move the plastic tube 71 away from the extrusion means.

An optional method of moving the plastic tubing 71 is to apply any suitable means to move conveyor belts 85, thus moving the plastic tubing which rotates the rotary molds 82.

The rotary mold surfaces 81 may be shaped to form variously shaped objects and the pinching blocks 83 may contain cutting projections (not shown). Hollow articles of any desired length may be made by making the pinching blocks 83 retractable into the rotary mold for any desired number of revolutions before the pinching blocks move back into position to pinch the tubing. Die 76 may be replaced by rotary members, engaging and moving with the plastic tubing in a manner similar to rotary molds 82, fitted into the end of the pressurized enclosure to block the escape of fluid under pressure from the pressurized enclosure. Fans driven by electric motors 86 are a cooling means for the rotary molds.

In the form of the invention shown in FIGURE 6 an extrusion machine 100 extrudes thermoplastic tubing through crosshead die 101 into a pressurized enclosure 102. A liquid spray 103 partially cools and hardens the thermoplastic tube and also cools and lubricates the die.

The plastic tubing passes through the die 104 and out of the pressurized enclosure 102. The same means as used in FIGURE 5 are used to remove the liquid from the pressurized enclosure.

Fluid under pressure is introduced into the pressurized enclosure 102 by tube 105 and fluid under pressure is introduced into the plastic tubing by tube 107 and through passage 106 in the crosshead die 101. Tube 105 is connected to any convenient fluid under pressure through a diaphragm type pressure regulator 108. Tube 107 is connected to the same source of fluid under pressure through diaphragm pressure regulator 109. In ordinary use a diaphragm pressure regulator uses atmospheric pressure on one side of the diaphragm as a reference pressure. Pressure regulator 109 has tube 110 connected to tube 105, which contains pressure practically the same as in the pressurized enclosure 102. Through the tube 110 the atmospheric pressure is replaced as a reference pressure by the pressure in the pressurized enclosure. By this means pressure regulator 109 can be set to provide a desired differential either plus or minus between the pressure in the plastic tube and the pressurized enclosure as the pressure is changed by pressure regulator 108.

The temperature of the liquid spray 103 and the speed of travel of plastic tube 115 through the pressurized enclosure 102 is adjusted so that the optimum temperature, of the plastic material used for making a heat shrinkable tubing by stretching, is attained as the plastic tube 115 passes through the die 104 and therefore out of the pressurized enclosure. The pressure inside of the tubing is maintained at a sufficient level to expand the plastic tubing after it passes through die 104, where it is sized and cooled and hardened by contact with die 111.

The pressure within the plastic tubing is held within the tubing by leather cup 112 mechanically connected to rollers 114 which are held from traveling within the tubing by the flexible walls of the plastic tube 115 being bent inward by feed rollers 113 to create a smaller dimension in the tubing than the dimension formed by the outermost surfaces of rollers 114. The feed rollers 113 are turned by any convenient means and move the tubing continuously from the extrusion machine through the feed rollers to an area where further operations may be performed on the tubing.

Various parts of the forms of the invention shown may be used in different combinations and still fall within the scope of this invention.

In any of the forms shown any method may be used for cooling and hardening the plastic material such as water trough, the fluid under pressure, moving air, or other means known to those familiar with this type of machinery.

While the machines shown have been designed primarily for use with thermoplastic materials such as polyethylene, polystyrene, modified styrenes, cellulose acetate, polyvinyls and similar materials, any material possessing suitable characteristics of plasticity may be used.

It will be apparent to those familiar with the use of plastic materials and molding machinery that the temperature used, pressures needed and the timing and speed of the operations involved will vary considerably with the material used, the thickness of the wall of the article, temperature of mold, shape of the article and the rate of production of the articles produced.

The invention may be carried out in other specific ways than those described in the foregoing description without departing from the essential characteristics and spirit of the invention and therefore the embodiments described are to be considered illustrative and all forms coming within the scope of the following claims are intended to be included therein.

I claim:

1. Method of making hollow articles comprising forming plastic tubing by extruding plastic material from an extrusion means and forming into tubing; maintaining a fluid under pressure, above atmospheric pressure, within the section of tubing from the tubing forming means to, and including, the section of tubing within a molding device, which pressure is sufficient to expand any portion of that section when the outer surface of the wall of that portion is subjected to atmospheric pressure; surrounding a section of the tubing adjacent to the tube forming means, which section contains a section of tubing between the tube forming means and a molding device, with a fluid under a pressure higher than atmospheric pressure; enclosing a section of the tubing in a molding device; reducing fluid pressure within the molding device on the outside of the tubing enclosed therein to expand the tubing into contact with a surface of the molding device with the fluid under pressure maintained within the tubing; hardening the plastic material at least partially in the molding device and removing from molding device.

2. A method of expanding plastic tubing comprising continuously forming tubing by extruding plastic material in tubular form through an extrusion die; introducing a fluid under pressure into the tubing through a passage in the extrusion die and continuously maintaining that pressure, in the portion of the tubing between the extrusion die and the area where the tubing is expanded, at a pressure sufficient to expand the tubing when its outer surface is subjected to atmospheric pressure; surrounding, continuously, a section of tubing adjacent to the extrusion die with a fluid under pressure above atmospheric pressure; moving tubing into an area of reduced pressure, thereby expanding the tubing into contact with a molding surface moving with the tubing portion with which it is in contact until that tubing portion has at least partially hardened.

3. The method of making hollow plastic articles comprising forming plastic tubing by continuously extruding plastic material in tubular form through an extrusion die; admitting fluid under pressure into the inside of the tubing through a passage in the extrusion die to continuously maintain within a portion of that tubing a fluid pressure higher than atmospheric pressure and sufficient to expand the tubing when surrounded by fluid at atmospheric pressure; surrounding continuously a section of the tubing adjacent to the extrusion die and between the extrusion die and a molding device with a fluid under pressure higher than atmospheric pressure; enclosing a section of the tubing in a molding device, moving with the tubing, closing the end, furthest from the extrusion die, of the section of tubing in the molding device; reducing fluid pressure in the molding device on the outside of the tubing therein to expand the tubing into contact with the internal surfaces of the molding device with the fluid pressure introduced through the tubing section connecting the extrusion die with the section of tubing in the molding device.

4. Apparatus for making hollow plastic articles comprising a pressurized enclosure continuously maintained at a pressure above atmospheric pressure; means for continuously forming tubing in the pressurized enclosure comprising an extrusion die adapted to continuously extrude plastic material into the pressurized enclosure and means for forming the plastic material into tubing; means for admitting and maintaining a fluid under pressure above atmospheric pressure into the inside of that portion of the tubing from the formation of the tubing until the tubing is expanded against a molding surface, which pressure is sufficient to expand the tubing when it is surrounded by atmospheric pressure; means for enclosing a section of the continuously moving tubing within the pressurized enclosure within mold parts; means for releasing the fluid pressure in the mold on the outside of the tubing enclosed therein thereby forcing the plastic material against the inner surfaces of the molding device.

5. The method of expanding plastic tubing comprising continuously forming tubing from plastic material being extruded; continuously maintaining a fluid under pressure in the inside of a portion of the tubing immediately upon formation of the tubing, which pressure is sufficient to expand the tubing when the outer wall is subjected to atmospheric pressure; continuously surrounding a section of tubing adjacent to the tube forming means with a fluid under pressure above atmospheric pressure; continuously moving tubing into an area of reduced pressure surrounding tubing and immediately after, and as a result of moving into area of reduced pressure, expanding the tubing into contact with mold surfaces which cool and harden the plastic material at least partially with the expanding force being the fluid pressure which has been contained continuously within the tubing since the formation of the tubing.

6. The method of making hollow thermoplastic articles comprising continuous forming of plastic tubing by extruding thermoplastic material, through an extrusion die, in tubular form; enclosing a section of the tubing in a molding device moving with the tubing; introducing a fluid under pressure, through a passage in the extrusion die, into the inside of the tubing and maintaining that pressure, in the section of tubing from the extrusion die to the section in the molding device, at a pressure sufficient to expand that tubing against atmospheric pressure surrounding that tubing; surrounding the section of tubing between the extrusion die and molding device with a fluid under pressure higher than atmospheric pressure; closing the ends of the section of tubing in the molding device; hardening the tubing at least partially by contact with a molding surface in the molding device and removing the tubing section from molding device.

7. Apparatus for forming plastic articles comprising an enclosure; means for maintaining a fluid under continuous pressure above atmospheric pressure within the enclosure; means adapted to continuously extrude plastic material into the enclosure and for forming the material into a tubular structure; means for continuously maintaining a fluid within a portion of the tubular structure, adjacent the means for forming the tubular structure, at a pressure sufficient to expand the tubular structure when the outer surface of the wall of the tubular structure is subjected to atmospheric pressure; means for continuously moving successive portions of the tubular structure in the enclosure and containing fluid under pressure into an area of reduced fluid pressure surrounding the tubular structure thereby expanding the tubular structure; a molding surface radially disposed about the tubular structure in the area of reduced fluid pressure surrounding the tubular structure and adapted to be contacted by the outer surface of the wall of the tubular structure being expanded by the fluid pressure contained therein; means for moving the molding surface with the wall of the tubular structure in contact with the molding surface until the wall of the plastic structure has at least partially hardened.

8. Method of shaping the wall of a thermoplastic structure comprising continuous forming of a plastic structure by continuously extruding thermoplastic material; shaping a portion of the wall of the plastic structure by forcing the outer surface of that portion of the wall, with fluid pressure maintained on the opposite inner surface of that wall, into contact with a molding surface moving together with that portion of the wall until the plastic wall has at least partially cooled and hardened; maintaining the fluid pressure on the inner surface of the wall of the plastic structure from the extrusion means until the wall of the plastic structure has been forced against the molding surface, this pressure being maintained at a pressure sufficient to force the wall of the plastic structure outwardly when fluid pressure on the opposite outer surface of the wall is subjected to atmospheric pressure; maintaining continuously a fluid under pressure above atmospheric pressure on the outer surface of the wall of the plastic structure adjacent the extrusion means and between the extrusion means and the area where a portion of the wall is forced against a molding surface; continuously moving the plastic structure from the extrusion die, through the area where the fluid pressure is maintained on the outer surface of the wall and into the area where the outer surface of the wall is forced into contact with the molding surface, this forcing of the wall being accomplished by subjecting the outer surface of that portion of the wall to a fluid pressure reduced sufficiently to allow the fluid pressure maintained on the inner surface to force the wall outwardly against the molding surface.

9. Apparatus for making hollow articles comprising extrusion means continuously forming tubing by extruding through an extrusion die, plastic material in tubular form; means for introducing a fluid under pressure through a passage in the extrusion die, and into the inside of the tubing being formed, and for continuously maintaining that fluid, in a portion of the tubing from the extrusion die to the area where the tubing is expanded against molding surfaces, at a sufficient pressure to expand the tubing when it is surrounded by atmospheric pressure; a molding surface in the area where the outer surface of the tubing wall is first subjected to pressure reduced toward atmospheric pressure sufficiently to cause expansion of the tubing and so placed that a portion of the wall of the tubing comes into contact with that molding surface when the tubing is expanded by the fluid under pressure continuously maintained within the tubing; an enclosure surrounding a portion of the tubing adjacent the extrusion die and between the extrusion die and the area where the tubing is being expanded; means for continuously maintaining, in that enclosure, a fluid under a pressure above atmospheric pressure and sufficient to prevent expansion of the portion of the tubing in that enclosure.

10. Method of expanding plastic tubing comprising the continuous forming of plastic tubing by extruding plastic material and forming into tubing; maintaining continuously a fluid under pressure within that portion of tubing from the formation of the tubing to the point where the tubing is expanded against a molding surface, this pressure being sufficient to expand the tubing when the outer surface is subjected to atmospheric pressure; continuously maintaining, around a section of the tubing adjacent the tube forming means and between the tube forming means and the area where the tubing is being expanded against a molding surface, a fluid under a pressure substantially constant and above atmospheric pressure and sufficient to control expansion of that tubing section; expanding the tubing into contact with a molding surface by reducing the pressure on the outer surface of a section of the wall of the tubing to allow it to expand against the molding surface.

11. The method of performing operations on the wall of a tubular structure which comprises forming a tubular structure by extruding through an extrusion die, plastic material in tubular form; maintaining a mandrel, with an enlarged diameter on a portion of the mandrel, within the tubular structure and extending therein from the extrusion die; enclosing sections of the tubular structure containing the enlarged diameter on the mandrel within a molding device, a portion of which, between the enlarged diameter on the mandrel and the extrusion die, is adapted to contact the outer surface of the plastic structure thereby maintaining an internal diameter of the opposite inner surface of the plastic structure smaller than a diameter of the enlarged section of the mandrel; expanding a section of the tubular structure within the mold with fluid under pressure introduced into the tubular structure through a passage in the extrusion die; moving the molding device in a direction away from the extrusion die so that the enlarged diameter of the mandrel shapes the plastic by being forced through the smaller inside diameter of the section of the plastic structure.

References Cited in the file of this patent

UNITED STATES PATENTS

| | | |
|---|---|---|
| 588,926 | Owens | Aug. 24, 1897 |
| 1,737,874 | Busch | Dec. 3, 1929 |
| 2,493,439 | Braund | Jan. 3, 1950 |
| 2,519,375 | Jargstorff | Aug. 22, 1950 |
| 2,790,994 | Cardot | May 7, 1957 |
| 2,792,591 | Cardot | May 21, 1957 |
| 2,810,934 | Bailey | Oct. 29, 1957 |